Figure 3:
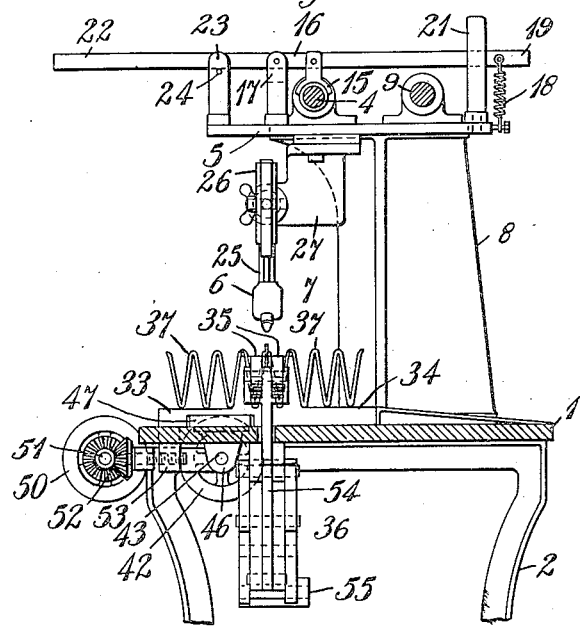

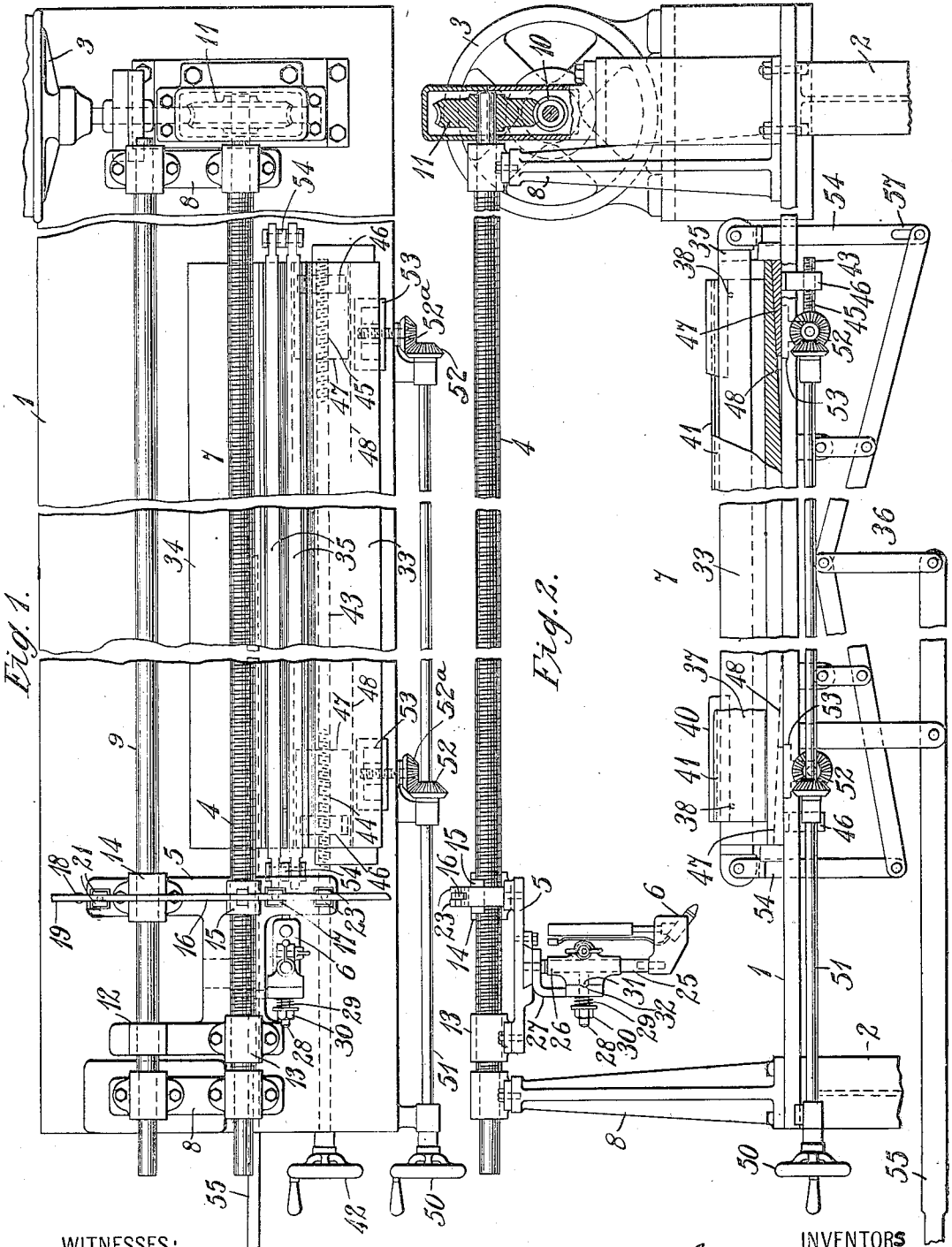

C. B. AUEL & J. A. BURNS.
WELDING MACHINE.
APPLICATION FILED MAY 22, 1911.

1,130,239.

Patented Mar. 2, 1915.
2 SHEETS—SHEET 2.

WITNESSES:
Fred H. Miller
D. W. Mace

INVENTORS
Carl B. Auel
James A. Burns
BY
Wesley G. Carr
ATTORNEY

UNITED STATES PATENT OFFICE.

CARL B. AUEL, OF WILKINSBURG, AND JAMES A. BURNS, OF PITTSBURGH, PENNSYLVANIA, ASSIGNORS TO WESTINGHOUSE ELECTRIC AND MANUFACTURING COMPANY, A CORPORATION OF PENNSYLVANIA.

WELDING-MACHINE.

1,130,239.

Specification of Letters Patent.

Patented Mar. 2, 1915.

Application filed May 22, 1911. Serial No. 628,736.

*To all whom it may concern:*

Be it known that we, CARL B. AUEL and JAMES A. BURNS, citizens of the United States, and residents, respectively, of Wilkinsburg and Pittsburgh, in the county of Allegheny and State of Pennsylvania, have invented a new and useful Improvement in Welding-Machines, of which the following is a specification.

Our invention relates to welding machines, and it has special reference to devices of this character that are adapted to weld together the component sections of corrugated tanks, plates and the like.

One object of our invention is to simplify the construction and mode of operation of such devices as those above indicated and particularly to provide a rugged and effective work-holding means whereby the adjacent corrugated sections, that are to be welded, may be held rigidly in position throughout their entire length.

Another object of our invention is to provide a considerable element of adjustability in the work-holding means and to further provide means whereby the work to be welded may be readily released from the work-holding means by a slight effort on the part of the operator.

According to our invention, we provide a device of the above-indicated character which embodies a heating device or torch which is adapted to be moved longitudinally in operative relationship with the work to be welded and a longitudinally disposed work-holding means which comprises grooved and relatively adjustable members to receive the corrugated sections, and coöperating movable clamping members which secure said sections rigidly in position by means of a suitable linkage mechanism.

Means are further provided to support an auxiliary strip of metal between the adjacent edges of the corrugated sections in order that a slight excess of metal shall be provided, which, when fused, tends to thicken the metal sheet and materially strengthen it at the welded portion. We do not wish to be limited in this respect, as the auxiliary strip of metal may be omitted and the adjacent edges of the sections may be turned up to form lips or flanges which are adapted to furnish the excess material necessary to insure a strong and rigid seam or joint. Adjustability is provided, both vertical and horizontal, for the purpose of alining the adjacent edges of the sections to be welded and for bringing said edges into intimate contact with the auxiliary strip of metal which is inserted between them. Furthermore, a pin-and-slot connection is provided at one end of the operating linkage mechanism, so that one end of the clamping members is withdrawn prior to the other, whereby undue frictional resistance is obviated and the work may be readily released.

Our invention may best be understood by reference to the accompanying drawings, in which—

Figure 4:
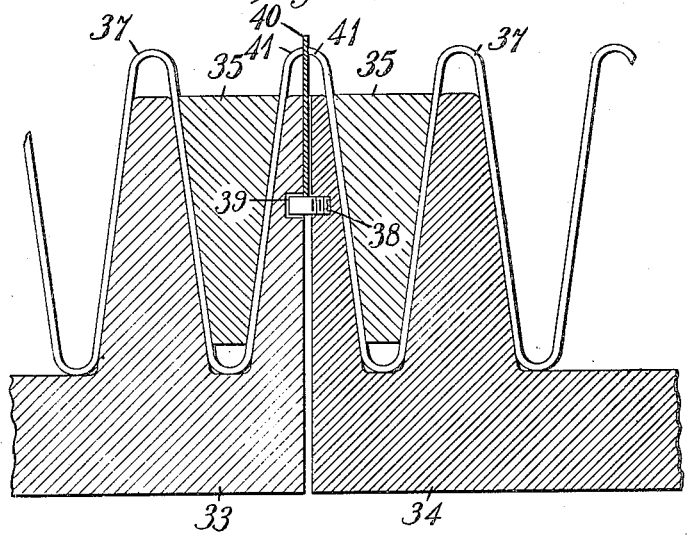

Figure 1 is a plan view of a device constructed in accordance with our invention, Fig. 2 is a view, partially in side elevation and partially in vertical section, and Fig. 3 is a view, partially in end elevation and partially in vertical section, of the device shown in Fig. 1. Fig. 4 is an enlarged sectional view of a portion of the work-holding means shown in the preceding figures.

Referring to the drawings, the device shown comprises a bed or frame 1 mounted on suitable standards 2, a driving motor 3, a lead screw 4 operatively associated with said motor, a movable carriage 5, a heating device or torch 6 suspended from said carriage, and a work-holding means 7.

The lead screw 4 is supported at its ends by brackets 8 that are mounted upon the frame 1, said brackets serving also to support a guide rod 9 for a purpose to be hereinafter set forth. The driving motor 3 is mounted at one end of the frame 1 and is operatively associated with the lead screw 4 by means of a worm 10 and a worm-wheel 11 in the usual manner.

The movable carriage 5 is carried upon the guide rod 9 and the lead screw 4 by means of supporting bearing members 12, 13 and 14, and a threaded member 15 which is adapted to circumferentially engage the threaded lead screw 4 over a portion of its periphery in such manner that the carriage 5 is advanced longitudinally in accordance with the operation of the driving motor 3.

The threaded member 15 is pivotally supported upon a lever 16 which has a pivotal support between the upright members 17, and said threaded member 15 is normally maintained in coöperative engagement with the lead screw 4 by means of a spring 18 which is connected between the inner end 19 of the lever 16 and the movable carriage 5. The lever 16 may be moved in a vertical plane, its inner end 19 being guided by the upright members 21 while its outer end 22 constitutes a handle and moves between upwardly projecting members 23, a pin 24 being provided in said members 23 for the purpose of maintaining the lever 16 in any desired position.

The heating device or torch 6 is preferably of the well-known oxy-acetylene type, although any other suitable device for accomplishing the desired result may be employed. Inasmuch as the heating device 6 pertains only indirectly to our invention, in performing a necessary function in the operation of the machine, we do not deem it necessary to describe the same or its mode of operation.

The heating device 6 is secured to the lower end of a rod 25 that is adjustably fitted into a sleeve 26, which, in turn, is suspended from the movable carriage 5 by means of a supporting bracket 27. The sleeve 26 is pivotally associated with the supporting bracket 27 by means of a pin 28, so that it may be swung on either side of its vertical position. The adjacent surfaces of the sleeve 26 and the supporting bracket 27 are maintained in engagement by means of a spring 29 which surrounds the rod 28 and is disposed between the bracket member 27 and a nut 30. In order to accentuate the normal operating position of the heating device 6, the adjacent surfaces of the sleeve 26 and the bracket member 27 are respectively provided with a projecting portion 31 and a coöperating recess 32.

The work-holding means 7 comprises relatively adjustable work-receiving members 33 and 34, coöperating movable clamping members 35, and a linkage mechanism 36 for operating the same. The work-receiving members 33 and 34 are grooved longitudinally in such manner as to receive the corrugated sections 37 that are to be welded, the contour of said grooves being such as to conform to the shape of the corrugated sections, so that said sections may be held rigidly in position.

Pins 38 are provided in the inner surface of the work-receiving member 34 and extend into suitable recesses 39 in the adjacent surface of the work-receiving member 33 in such manner that an auxiliary strip of metal 40 may rest thereon between the adjacent edges 41 of the corrugated sections 37 to be welded together.

In order to secure a proper relation between the adjacent edges 41 of the corrugated sections 37, a vertical adjustment of the work-receiving member 33 is effected by means of a hand wheel 42 which is secured to one end of a rod 43 having oppositely threaded portions 44 and 45, the latter portions being operatively associated with downwardly projecting members 46 which form parts of tapered blocks 47. The blocks 47 rest upon the frame or bed 1 and are adapted to be moved longitudinally in opposite directions within tapered recesses 48 which are provided in the opposite ends of the work-receiving member 33. It is thus evident that, by moving the hand wheel 42, the wedge-shaped or tapered blocks 47 are simultaneously operated to effect such vertical adjustments of the member 33 that the adjacent edges 41 of the corrugated sections 37 may be brought into proper relation. In order to bring the adjacent edges 41 into intimate contact with the auxiliary strip of metal 40, a horizontal adjustment of the work-receiving member 33 is accomplished by means of a hand wheel 50 which is attached to one end of a rod 51, said rod being provided with bevel gear wheels 52 that mesh with bevel gear wheels 52$^a$ the shafts of which screw into projecting members 53 that are secured to the work-receiving member 33. Horizontal transverse movements of the receiving member 33 may thus be obtained by means of the hand wheel 50, as will be readily understood.

The clamping members 35 are of wedge shape in cross section and are adapted to conform to the contour of the corrugated sections 37 in such manner as to clamp said sections to the receiving members 33 and 34. The clamping members 35 are longitudinally disposed and are supported at their ends upon upright members 54. The upright members 54 are connected to a suitable operating lever 55, through the linkage mechanism 36 in such manner that the clamping members 35 may be raised out of, or lowered into, engagement with the coöperating receiving members 33 and 34. We do not consider it necessary to set forth in detail the specific structure of the linkage mechanism 36, inasmuch as various modifications may be effected therein and any suitable device for accomplishing the same purpose may be employed. It should be noted, however, that the lower end of one of the upright members 54 is associated with said linkage mechanism 36 by means of a pin-and-slot connection 57, so that, as the clamping members 35 are raised out of engagement with the corrugated sections 37 by means of the lever 55, one end of each of said clamping members is raised slightly in advance of the other end. Thus, undue frictional resistance is eliminated which would otherwise be encountered in case both ends of the clamping members 35 were raised simultaneously.

Assuming the driving motor 3 and the heating device or torch 6 to be performing their intended functions and that the various parts of the apparatus occupy the positions shown, the mode of operation of the device is as follows: Inasmuch as the threaded member 15 is in coöperative engagement with the lead screw 4, it is evident that the heating device 6 is advanced longitudinally into coöperative relationship with the work to be welded. As the heating device 6 advances along the work, sufficient heat is applied thereto to melt down or fuse the excess material supplied by the auxiliary strip of metal 40, and to securely weld together the adjacent edges 41 of the sections 37, thus providing a particularly strong seam or joint. When the heating device 6 has traversed the entire length of the corrugated sheets 37, the operation of the machine may be stopped, care being taken to swing the heating device 6 upwardly in one direction or the other upon its pivotal support 28, in order to prevent further application of heat to the clamping members 35 which otherwise would be subjected to an injurious temperature. In case it is desired to discontinue the operation while the heating device 6 is in coöperative relationship with the work, it is merely necessary to force the handle 22 of the lever 16 downwardly, thereby raising the threaded member 15 out of engagement with the lead screw 4. When this is done, the heating device 6 should be removed from coöperative relationship with the work, as hereinbefore explained, in order that holes shall not be burned therein by the continued application of heat. The operation may be resumed at any time by lowering the threaded member 15 into operative engagement with the lead screw 4 and by moving the heating device 6 into its normal vertical position.

In order to release the work from the work-holding means, the lever 55 is forced upwardly, thereby causing the upright members 54 to be raised and, hence, raising the clamping members 35 out of engagement with the corrugated sheets 37. It will be understood that, by reason of the pin-and-slot connection 57, the right-hand end of each clamping member 35 is raised last, so that the clamping members are withdrawn on an inclination to the horizontal and undue frictional resistance is avoided.

Such modifications and changes in the specific structural details and in the arrangement and location of parts as may be effected by those skilled in the art without materially changing the mode of operation or the result, are to be understood as included within the spirit and scope of our invention.

We claim as our invention:

1. In a welding machine, the combination with a heating device and means for moving said heating device in coöperative relationship with the work to be welded, of work-holding means adapted to clamp the work throughout its entire length and means for releasing one end of said work holding means prior to the other.

2. In a welding machine, the combination with a heating device and means for moving said device in coöperative relationship with the work to be welded, of adjustable means for clamping said work rigidly in position and a linkage mechanism for releasing one portion of said clamping means prior to the other.

3. In a welding machine, the combination with a heating device and means for moving said device longitudinally in coöperative relationship with the work to be welded, of a plurality of longitudinally disposed clamping members adapted to secure the work rigidly in position and means for obtaining vertical and horizontal relative adjustment between the clamping members.

4. In a welding machine, the combination with a heating device and means for moving said device in coöperative relationship with the work to be welded, of longitudinally grooved supporting members extending substantially the length of the machine to receive the work, and coöperating clamping members movable in the direction in which the said heating device is applied to the work and adapted to force the work into said grooved members throughout their entire length.

5. In a welding machine, the combination with supporting means, a movable carriage associated therewith, a source of heat associated with said carriage in coöperative relationship with the work to be welded, and means for moving said carriage longitudinally at a uniform rate, of work-holding means for clamping the work throughout its entire length and means for releasing one end of said work-holding means prior to the other end.

6. In a welding machine, the combination with a heating device, and means for moving said device longitudinally in coöperative relationship with the work to be welded, of adjustable means for clamping the work in position comprising a plurality of longitudinally disposed and relatively movable clamping members and means for releasing one end of the clamping means before the other.

7. In a machine for welding metal sheets, the combination with a heating device, and means for moving said device in coöperative relationship with said sheets, of longitudinally grooved supporting means extending substantially the length of the machine, and vertically movable means coöperating with said supporting means for clamping said sheets in position.

8. In a machine for welding metal sheets, the combination with a heating device, and means for moving said device longitudinally along said sheets, of means for supporting said sheets, and longitudinally disposed means coöperating with said supporting means for clamping said sheets in position and means for releasing one end of said clamping means prior to the other end thereof.

9. In a machine for welding corrugated metal sheets, the combination with a heating device and means for moving said heating device in coöperative relationship with the work to be welded, of grooved means for receiving said corrugated sheets, and movable wedge-shaped means to coöperate with said grooved means and to clamp said sheets in position.

10. In a machine for welding corrugated metal sheets, the combination with a heating device and means for moving said device in coöperative relationship with said sheets, of relatively adjustable grooved members to receive said sheets, and movable wedge-shaped means to coöperate with said grooved members and to hold said sheets rigidly in position.

11. In a machine for welding corrugated metal sheets, the combination with a heating device, and means for moving said device longitudinally in coöperative relationship with said sheets, of relatively adjustable and longitudinally disposed grooved members adapted to receive said corrugated sheet, and longitudinally disposed wedge-shaped members supported at the ends and adapted to be moved into coöperative engagement with said sheets and to clamp said sheets to said grooved members.

12. In a machine for welding metal sheets, the combination with a heating device and means for moving said device at a uniform rate in coöperative relationship with said sheets, of stationary longitudinally disposed means for supporting said sheets, movable means supported at the ends to coöperate therewith, and means for actuating said movable means to clamp said sheets in position.

13. In a machine for welding corrugated metal sheets, the combination with a heating device and means for moving said device in coöperative relationship with said sheets, of relatively adjustable and longitudinally disposed members for supporting said sheets, longitudinally disposed coöperating movable members for clamping said sheets in position, and mechanical means for releasing one end of said sheets before the other.

14. In a machine for welding corrugated metal sheets, the combination with a heating device and means for moving said device longitudinally in coöperative relationship with said sheets, of longitudinally disposed supporting members for said sheets, means for relatively adjusting said members horizontally and vertically, longitudinally disposed movable members for clamping said sheets in position, and a mechanical linkage for supporting the ends of said movable members and for operating said movable members.

15. In a machine for welding corrugated metal sheets, the combination with a heating device and means for moving said heating device in coöperative relationship with said sheets, of means for severally supporting the sheets to be welded, means for supporting a strip of metal between the adjacent edges of said sheets, and adjusting means for alining the adjacent edges thereof and for bringing said edges into contact with said strip of metal.

16. In a machine for welding metal sheets, the combination with a heating device and means for moving said device in coöperative relationship with the sheets to be welded, of adjusting means for alining the adjacent edges of said sheets, and means for clamping said sheets in position.

17. In a welding machine, the combination with a work-holding means, a lead screw disposed above said work-holding means and adapted to be uniformly rotated, and a heating device suspended from said lead screw in coöperative relationship with said work, adjustable means for governing the association of said heating device with said lead screw, and means for swinging said heating device from said work.

In testimony whereof, we have subscribed our names this 17th day of May, 1911.

CARL B. AUEL.
JAMES A. BURNS.

Witnesses:
B. B. Hines,
M. C. Merz.

It is hereby certified that in Letters Patent No. 1,130,239, granted March 2, 1915, upon the application of Carl B. Auel, of Wilkinsburg, and James A. Burns, of Pittsburgh, Pennsylvania, for an improvement in "Welding-Machines," errors appear in the printed specification requiring correction as follows: Page 3, line 127, strike out the words "vertically movable;" same page, line 128, after the word "means" insert the words *and movable in the direction in which the said heating device is applied to the work;* page 4, line 98, before the word "adjustable" insert the word *of;* and that the said Letters Patent should be read with these corrections therein that the same may conform to the record of the case in the Patent Office.

Signed and sealed this 23rd day of March, A. D., 1915.

[SEAL.]

J. T. NEWTON,
*Acting Commissioner of Patents.*